United States Patent
Klingler et al.

[11] Patent Number: 5,888,140
[45] Date of Patent: Mar. 30, 1999

[54] TORSIONALLY STIFF, FLEXIBLE SHAFT COUPLING, ESPECIALLY ONE MADE ENTIRELY OF STEEL

[75] Inventors: Gunther Klingler, Oberostendorf; Christoph Dropman, Kaufbeuren; Johann Huber, Friesenried, all of Germany

[73] Assignee: Chr. Mayr GmbH & Co. KG, Mauerstetten, Germany

[21] Appl. No.: 814,547

[22] Filed: Mar. 11, 1997

[30]  Foreign Application Priority Data

Mar. 12, 1996 [DE] Germany .......................... 296 04 608.6

[51] Int. Cl.⁶ ........................................................ F16D 3/79
[52] U.S. Cl. ........................... 464/99; 464/147; 411/339; 411/383
[58] Field of Search ............................... 464/98, 99, 100, 464/147, 32; 403/2; 411/338, 339, 383, 384, 501, 500

[56]  References Cited

U.S. PATENT DOCUMENTS

| | | | |
|---|---|---|---|
| 1,387,532 | 8/1921 | Dexter | 464/99 |
| 3,703,817 | 11/1972 | Orwin | 464/99 |
| 3,835,615 | 9/1974 | King, Jr. | 403/2 |
| 3,960,456 | 6/1976 | Norris | 403/2 |
| 4,055,966 | 11/1977 | Fredericks | 464/99 |
| 4,073,161 | 2/1978 | Bury | 464/99 |
| 4,096,711 | 6/1978 | Carlson et al. | 464/99 |
| 4,318,281 | 3/1982 | Cutter et al. | |
| 4,492,583 | 1/1985 | Morrison | 464/147 |
| 4,708,692 | 11/1987 | Weiss | 464/147 |
| 4,717,178 | 1/1988 | Daghe et al. | 403/2 |
| 4,744,783 | 5/1988 | Downey et al. | 464/147 |
| 4,796,742 | 1/1989 | Etchell | 464/98 |
| 4,861,211 | 8/1989 | Dunsmore | 411/501 |
| 5,019,015 | 5/1991 | Wasserfuhr | 464/99 |

FOREIGN PATENT DOCUMENTS

| | | | |
|---|---|---|---|
| 460222 | 10/1949 | Canada | 464/99 |
| 9305154 U | 6/1993 | Germany . | |
| 1396200 | 6/1975 | United Kingdom . | |
| 1565834 | 4/1980 | United Kingdom . | |

*Primary Examiner*—Eileen Dunn Lillis
*Attorney, Agent, or Firm*—Ladas & Parry

[57]  ABSTRACT

A torsionally stiff, flexible shaft coupling, an all-steel shaft coupling for transmitting torques between shafts. Shafts with mutually offset axes, having one or two packs of plates (5) which are places on clamping bushes (6) and are clamped on the latter, by a ring (4) in each case, against an end collar (6b) of the clamping bushes (6), the packs of plates (5) being clamped, by screws (2, 7) extending through the clamping bushes (6), alternately in the circumferential direction using the mutually opposite flanges (1a, 8a) of hubs (1, 8) to be coupled to one another, which of packs of plates, in order to achieve the object of increasing the displacement capability of the plates and thus simplifying the assembly and increasing the operational reliability, comprise a circumferential relief groove (4a) and (6a) in each of the rings (4) and/or the collars (6b) of the clamping bushes (6). Alternatively, the conical end of the clamping bush (6) is provided with a circumferential groove or flute (6d), which may assume various rounded shapes.

14 Claims, 2 Drawing Sheets

TORSIONALLY STIFF, FLEXIBLE SHAFT COUPLING, ESPECIALLY ONE MADE ENTIRELY OF STEEL

BACKGROUND OF THE INVENTION

The invention relates to a torsionally stiff, flexible shaft coupling, especially an all-steel shaft coupling.

In the case of these couplings, the contour and shape of the rings and of the collars of the clamping bushes have a decisive influence on the displacement capability of the coupling. In operation, given high displacement values of the coupling, breakages, in particular permanent breakages, occurred on the plates along the edge of the clamping region. The normal use of round washers, which have a pronounced bevel at their edges, achieved no improvement. Since an increased displacement capability of such a coupling greatly simplifies its mounting, the invention is based on the object of increasing the value of the admissible displacement of the packs of plates and thus to achieve an increased operational reliability of such a coupling.

This invention was based on the consideration that high notch factors at the transition between the ring or collar and plates, and thus a sharply reduced admissible material stress of the plates along the edge of the clamping region, could be the cause of the breakages observed.

BRIEF DESCRIPTION OF THE DRAWINGS

Exemplary embodiments of the invention are shown in the drawings, in which.

DESCRIPTION OF PREFERRED EMBODIMENTS

Figure 1:
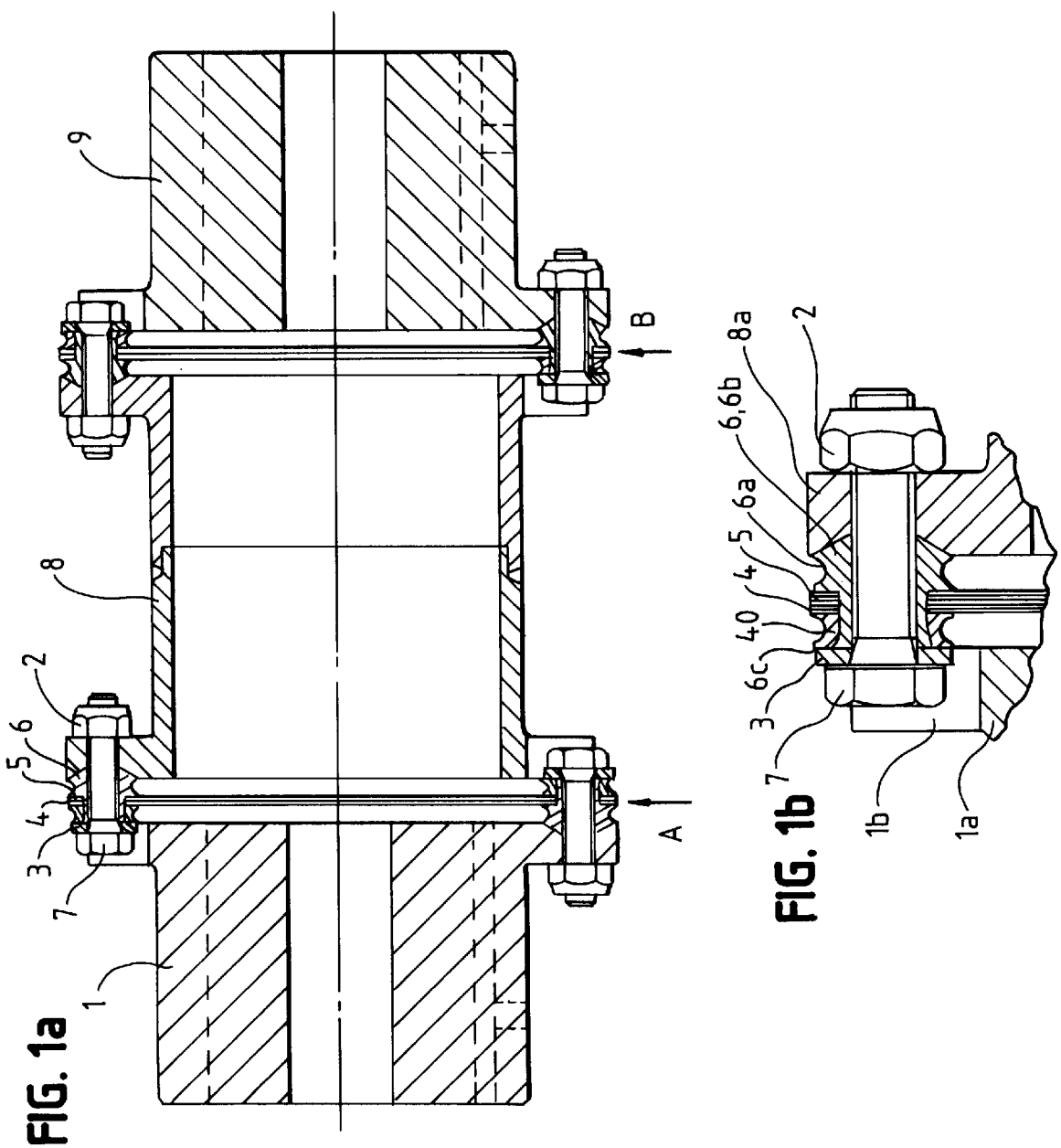
FIG. 1a shows, in a schematic longitudinal section, a flexible, torsionally stiff shaft coupling
FIG. 1b shows an enlarged detail from FIG. 1a FIG. 2 shows a second exemplary embodiment.
Figure 2:
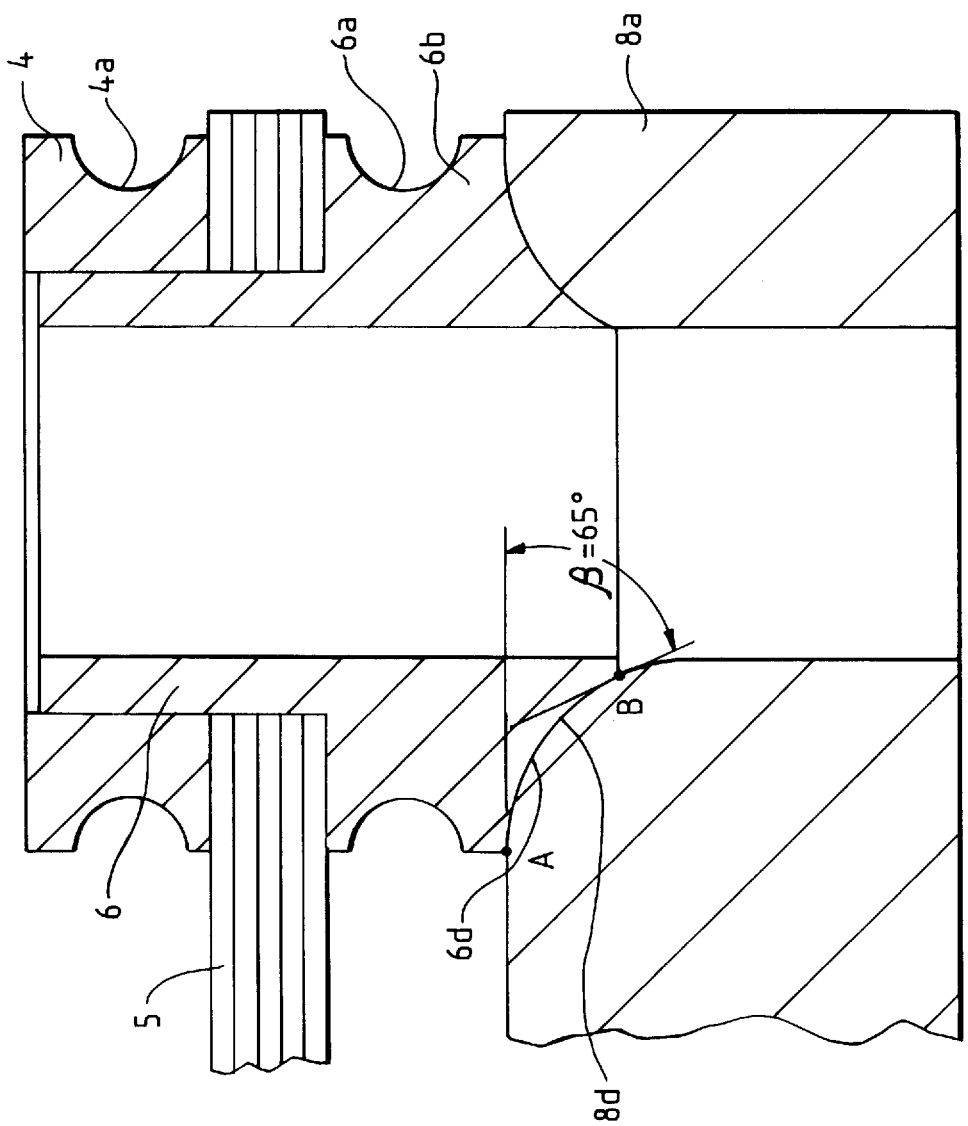

According to FIG. 1a, a hub 1 is coupled to a hub 9 in a torsionally stiff, angularly, axially and laterally moveable manner via two packs of plates A, B according to the invention and a sleeve 8 arranged therebetween. Since the two packs of plates A and B are identical, it is sufficient to describe one of them. The pack of plates A or B has a pack of annular or segment-shaped plates 5 which are clamped together axially. For this purpose, the plates have a plurality of axial holes which are distributed around the circumference and in which clamping bushes 6 are inserted. On one side, the pack of plates 5 rests against and end collar 6b of the clamping bush 6, said collar being of flat conical design on its other side. On the other side, the pack of plates rests against a ring 4 which is fitted onto the clamping bush 6. If the free end 6c of the clamping bush 6, as shown, is flanged, then the pack of plates 5 is fixed on the clamping bushes 6 and the whole can be installed as a unit or handled as a spare part. The pack of plates 5 is installed in the coupling by means of the screws 7 and the nuts 2. Washers 3 can be arranged between the screw head 7 and the ring 4.

As shown in FIG. 1b, one flange 1a of the hub 1 has recesses 1b, the head of the screw 7 being located in one of these recesses 1b, opposite each of which there is an intact section of a flange 8a of the sleeve 8 as a rest for the nut 2; in the case of the next screw 7 in the circumferential direction, the relationships are a mirror image of this, that is to say its head lies in such a recess in the flange 8a, as is shown, for example, at the lower edge of FIG. 1 on the radially opposite side of the shaft coupling A.

According to the invention, the ring 4 and/or the collar 6b of the clamping bush 6 is provided with a circumferential relief groove 4a or 6a. The relief grooves are designed such that a soft transition between the free plate region and the fixed clamping region is ensured. To this end, the relief grooves 4a, 6a are preferably of an arcuate shaped, which can be circular, parabolic or elliptical; however a trapezoidal or triangular shape is equally possible.

By means of this invention it is possible to increase the displacement capability of plates, packs of plates and hence of couplings of this constructional type and, by this means, to increase the ease of assembly and operational security of such shaft couplings.

The shape according to the invention of the end collar 6b is shown having a circumferential concave groove or flute 6d, which lies opposite a corresponding convex shape 8d of the flange 8a and in which the latter engages. The concave shape 6d and the convex shape 8d fit into one another exactly. The flute 6d may occupy the entire width of the original conical outer surface shape. It is preferably rounded in a parabolic, elliptical or circular shape.

The concave shape (6d) of the clamping bush (6) is preferably designed such that the tangents through the points A and B intersect at an angle $\beta=65°$. However, the angle $\beta$ can also assume any other values between $>0°$ and $90°$.

In the case of the tapered or conical end shape according to FIGS. 1a and 1b, it is possible for a crooked position to occur if there are circumferential and radial forces. In this case, tribocorrosion and an increase in the zero play may occur. In the case of the curved configuration according to a preferred form of the invention, this risk is ruled out. In addition, it is possible in this way for finishing tolerances to be compensated, so that full-area contact between the flute 6d and the convex mating shape 8d of the flange 8a prevails. This has in turn the advantages of lower area pressure and lower settling phenomena.

We claim:

1. A torsionally stiff, flexible shaft coupling for connecting shafts and for transmitting torques between the shafts, said shaft coupling comprising at least one pack of plates, and clamping bushes, said at least one pack of plates being placed and clamped on the clamping bushes by means of a ring for each bush, against an end collar of each of clamping bushes, the packs of plates being tightly clamped, by means of threaded fasteners extending through the clamping bushes, alternately arranged in the circumferential direction around the shafts to be coupled to one another, and a circumferential relief groove respectively formed in each of the rings and the collars of the clamping bushes.

2. The coupling as claimed in claim 1, wherein each of the relief grooves has a concave shape.

3. The coupling as claimed in claim 1, wherein each of the relief grooves is in a parabolic shape.

4. The coupling as claimed in claim 1, wherein each of the relief grooves is in an elliptical shape.

5. A torsionally stiff, flexible shaft coupling for coupling shafts, and for transmitting torques between the shafts, said coupling comprising at least one pack of plates, and clamping bushes, said at least one pack of plates being placed on the clamping bushes and clamped thereon by a ring and held against an end collar of the clamping bushes, the packs of plates being clamped, by means of threaded fasteners extending through the clamping bushes, alternately arranged in the circumferential direction, around the shafts to be coupled to one another, the clamping bushes having a nestable shape on the end collar surface, which shape engages in a corresponding recess in an associated flange, and wherein the end collar of each of the clamping bushes has a circumferential arcuate groove.

6. The coupling as claimed in claim 5, wherein the nestable shape on the end collar surface has shape of a concave flute occupying the entire outer surface.

7. The coupling as claimed in claim 6, wherein the flute is located opposite a corresponding convex shape of the flange.

8. The coupling as claimed in claim 7, wherein the flute and the convex shape fit into one another.

9. The coupling as claimed in claim 6, wherein the groove is located opposite a corresponding convex shape of the flange.

10. The coupling as claimed in claim 6, wherein the shape of the flute is parabolic.

11. The coupling as claimed in claim 6, wherein the groove has a concave shape.

12. The coupling as claimed in claim 6, wherein the shape of the flute is elliptical.

13. The coupling of claim 5, wherein the end collar surface has a tapered, conical shape.

14. The coupling as claimed in claim 1, wherein the groove has a concave shape.

* * * * *